(12) United States Patent
Xie et al.

(10) Patent No.: US 12,029,229 B2
(45) Date of Patent: Jul. 9, 2024

(54) ULTRASONIC FREEZING EQUIPMENT AND FREEZING METHOD USING SAME

(71) Applicant: Shanghai Ocean University, Shanghai (CN)

(72) Inventors: Jing Xie, Shanghai (CN); Qijun Xu, Shanghai (CN); Jinfeng Wang, Shanghai (CN); Yuyao Sun, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 562 days.

(21) Appl. No.: 17/315,410

(22) Filed: May 10, 2021

(65) Prior Publication Data

US 2021/0259288 A1   Aug. 26, 2021

(30) Foreign Application Priority Data

Jan. 14, 2021  (CN) .......................... 202110049445.9

(51) Int. Cl.
| | |
|---|---|
| *A23L 3/375* | (2006.01) |
| *A23B 4/015* | (2006.01) |
| *A23B 4/09* | (2006.01) |
| *A23B 4/26* | (2006.01) |
| *A23L 3/00* | (2006.01) |
| *A23L 3/30* | (2006.01) |

(52) U.S. Cl.
CPC .............. *A23L 3/375* (2013.01); *A23B 4/015* (2013.01); *A23B 4/09* (2013.01); *A23B 4/26* (2013.01); *A23L 3/001* (2013.01); *A23L 3/30* (2013.01); *A23V 2002/00* (2013.01)

(58) Field of Classification Search
CPC ............................. A23B 4/09; A23V 2002/00
See application file for complete search history.

(56) References Cited

U.S. PATENT DOCUMENTS

| | | | | |
|---|---|---|---|---|
| 4,968,520 | A | * | 11/1990 | Wang ..................... A23B 4/066 426/524 |
| 2008/0271730 | A1 | * | 11/2008 | Takenaka ................ A23L 3/365 126/344 |
| 2009/0007586 | A1 | * | 1/2009 | Takenaka .................. A23L 3/28 366/116 |
| 2019/0313673 | A1 | * | 10/2019 | Di Clerico ................ A23L 3/30 |
| 2021/0199369 | A1 | * | 7/2021 | Böttcher ............... H05B 6/686 |
| 2021/0207848 | A1 | * | 7/2021 | Xu ............................ E03B 7/07 |

FOREIGN PATENT DOCUMENTS

| | | |
|---|---|---|
| CN | 206683271 U | 11/2017 |
| CN | 210663533 U | 6/2020 |
| EP | 0513793 A2 | 11/1992 |
| JP | 2009216078 A * | 9/2009 |

OTHER PUBLICATIONS

Suzuki et al. (JP 2009216078 A), English Translation, Evaporated Fuel Processing Device, 2009, Whole Document (Year: 2009).*

\* cited by examiner

*Primary Examiner* — Larry L Furdge
*Assistant Examiner* — Keith Stanley Myers

(57) ABSTRACT

An ultrasonic freezing equipment, which includes a casing, a circulating pump system, an ultrasonic generator, a vortex-tube freezing device and a temperature-measuring device. A vertex tube is configured for refrigeration. A circulating salt solution inside the casing is configured to quickly and uniformly take away a heat of a food to be frozen, so as to efficiently freeze the food. A freezing method using the ultrasonic freezing equipment is also provided.

10 Claims, 4 Drawing Sheets

ULTRASONIC FREEZING EQUIPMENT AND FREEZING METHOD USING SAME

CROSS-REFERENCE TO RELATED APPLICATIONS

This application claims the benefit of priority from Chinese Patent Application No. 202110049445.9, filed on Jan. 14, 2021. The content of the aforementioned application, including any intervening amendments thereto, is incorporated herein by reference in its entirety.

TECHNICAL FIELD

This application relates to freezing equipment, and more particularly to an ultrasonic freezing equipment for aquatic products and other meat products and a freezing method using the same.

BACKGROUND

Ultrasonic-assisted freezing is a new type of food processing technology, in which an ultrasonic wave is introduced to control the volume, quantity and formation speed of ice crystallization in a frozen product (frozen food), improving the quality of the frozen product. The commercially available ultrasonic-assisted freezing equipment is usually customized. Conventionally, the ultrasonic-assisted freezing equipment is divided into two types. One is an ultrasonic generator, and needs to be put in a low-temperature environment to assist the freezing of the product. The other is an ultrasonic generator equipped with a refrigeration system, which can be directly used to perform the ultrasonic-assisted freezing, but it is relatively expensive, and thus is usually used in experiments. In addition, the two types of ultrasonic-assisted freezing equipment do not exhibit satisfactory freezing efficiency.

SUMMARY

An object of this disclosure is to provide an ultrasonic freezing equipment with low cost and high efficiency and a freezing method using the same.

To achieve the above-mentioned object, in a first aspect, the present disclosure provides an ultrasonic freezing equipment, which comprises:
  a casing;
  a circulating pump system;
  an ultrasonic generator;
  a vortex-tube freezing device comprising a vortex tube; and
  a temperature-measuring device;
  wherein the casing has a cuboid shape; a recess is provided inside the casing; the recess is of a hexagonal-prism shape; the recess is configured as a freezing chamber of the ultrasonic freezing equipment, and is configured to accommodate a salt solution; the salt solution is configured to immerse a food to be frozen; the circulating pump system is in communication with the recess; the circulating pump system is configured to perform a circulating flow of the salt solution in the recess; a refrigeration coil is arranged in the recess of the casing; the vortex-tube freezing device is connected to the refrigeration coil; the vortex-tube freezing device is configured to adjust a temperature of the salt solution through the refrigeration coil, so as to freeze the food to be frozen in the salt solution; the ultrasonic generator is configured to emit an ultrasonic wave to the food to be frozen in the salt solution, so as to reduce a damage during a freezing process; a control panel is arranged on the casing, and is configured to control a frequency of the ultrasonic generator; and the temperature-measuring device is arranged at an outer side of the ultrasonic generator, and is configured to measure a temperature of the salt solution.

The circulating salt solution inside the casing can quickly and evenly take away a heat from the food to be frozen, so as to freeze the food efficiently.

In an embodiment, the circulating pump system is arranged on the casing; the casing is provided with a salt solution inlet and a salt solution outlet; one end of the circulating pump system is communicated with the recess of the casing through the salt solution inlet; the other end of the circulating pump system is communicated with the recess of the casing through the salt solution outlet; and the salt solution in the recess of the casing is capable of entering the circulation pump system through the salt solution outlet under an action of the circulation pump system, and then flowing back into the recess through the salt solution inlet.

In some embodiments, the circulating pump system comprises an inlet pipe, a pump and an outlet pipe; the inlet pipe and the outlet pipe are connected through the pump; the inlet pipe is communicated with the recess of the casing through the salt solution inlet; the outlet pipe is communicated with the recess of the casing through the salt solution outlet; and the salt solution in the recess is driven under a suction of the pump to enter the inlet pipe, and flow back into the recess through the outlet pipe.

In some embodiments, a universal wheel is provided at a bottom of the casing.

In some embodiments, the ultrasonic generator is configured to emit ultrasonic waves of different frequency bands.

In some embodiments, the ultrasonic generator is configured to emit ultrasonic waves of three frequency bands, and the three frequency bands are 0-20 KHz, 20-40 KHz and 40-60 KHz, respectively.

In some embodiments, the ultrasonic generator comprises six ultrasonic generating plates arranged in the recess; the six ultrasonic generating plates consists of a first ultrasonic generating plate, a second ultrasonic generating plate, a third ultrasonic generating plate, a fourth ultrasonic generating plate, a fifth ultrasonic generating plate and a sixth ultrasonic generating plate; the first ultrasonic generating plate and the fourth ultrasonic generating plate are configured to emit an ultrasonic wave of 0-20 KHz; the second ultrasonic generating plate and the fifth ultrasonic generating plate are configured to emit an ultrasonic wave of 20-40 KHz; and the third ultrasonic generating plate and the sixth ultrasonic generating plate are configured to emit an ultrasonic wave of 40-60 KHz.

In some embodiments, the recess comprises six side surface connected end to end; the six ultrasonic generating plates are sequentially arranged on the corresponding six side surfaces of the recess, such that the first ultrasonic generating plate and the fourth ultrasonic generating plate are arranged opposite to each other; the second ultrasonic generating plate and the fifth ultrasonic generating plate are arranged opposite to each other; and the third ultrasonic generating plate and the sixth ultrasonic generating plate are arranged opposite to each other.

In an embodiment, a side wall of the casing is provided with a thermal insulation layer, and a thickness of the thermal insulation layer is 300-500 mm.

In some embodiments, the vortex tube freezing device comprises three groups of vortex tubes; each of the three groups of vortex tubes comprises two vortex tubes; and six vortex tubes in the three groups of vortex tubes are the same vortex tubes.

In some embodiments, the refrigeration coil is a serpentine coiled pipe.

In some embodiments, the ultrasonic freezing equipment further comprises an air compressor and a heat exchanger; the vortex tube comprises a vortex chamber, a cold-end tube and a hot-end tube communicated with each other; the cold-end tube is connected to the refrigeration coil; the hot-end tube is connected to the heat exchanger; the vortex chamber is connected to the air compressor; the air compressor is configured to compress air to obtain a working gas and transmit the working gas to the vortex chamber; the working gas is capable of doing work in the vortex chamber to form a cold air flow and a hot air flow; the cold air flow in the vortex chamber is capable of flowing to the refrigeration coil through the cold-end tube, and then exchanging heat with the salt solution in the recess through the refrigeration coil to adjust the temperature of the salt solution; and the hot air flow in the vortex chamber is capable of flowing to the heat exchanger through the hot-end tube, and then performing a heat exchange between the hot-end tube and an outside atmosphere through the heat exchanger.

In some embodiments, the six ultrasonic generating plates are divided into three groups; a first group consists of the first ultrasonic generating plate and the fourth ultrasonic generating plate; a second group consists of the second ultrasonic generating plate and the fifth ultrasonic generating plate; a third group consists of the third ultrasonic generating plate and the sixth ultrasonic generating plate; and the control panel is configured to control an operation mode of the three groups of ultrasonic generating plates of the ultrasonic generator.

In a second aspect, the present disclosure further provides a freezing method using the ultrasonic freezing equipment, which comprises:

preparing the salt solution, and injecting the salt solution into the recess inside the casing;

putting a food to be frozen into the salt solution;

turning on the vortex-tube freezing device to adjust a temperature of the salt solution;

turning on the circulating pump system to circulate the salt solution in the recess;

turning on the ultrasonic generator to emit an ultrasonic wave to the food to be frozen in the salt solution;

monitoring, by the temperature-measuring device, a temperature of the salt solution in real time; and taking out a frozen food from the salt solution after a freezing process is completed.

The beneficial effects of the present disclosure are described as follows.

A vortex-tube freezing device with relatively low price is used to freeze food, lowering the cost of the vortex-tube freezing equipment. In addition, a salt solution is used as a freezing medium to accelerate the freezing process of the food. Furthermore, a circulating pump system is provided herein to circulate the salt solution, such that a uniform temperature distribution inside the salt solution is enabled, facilitating enhancing the freezing efficiency.

Figure 1:
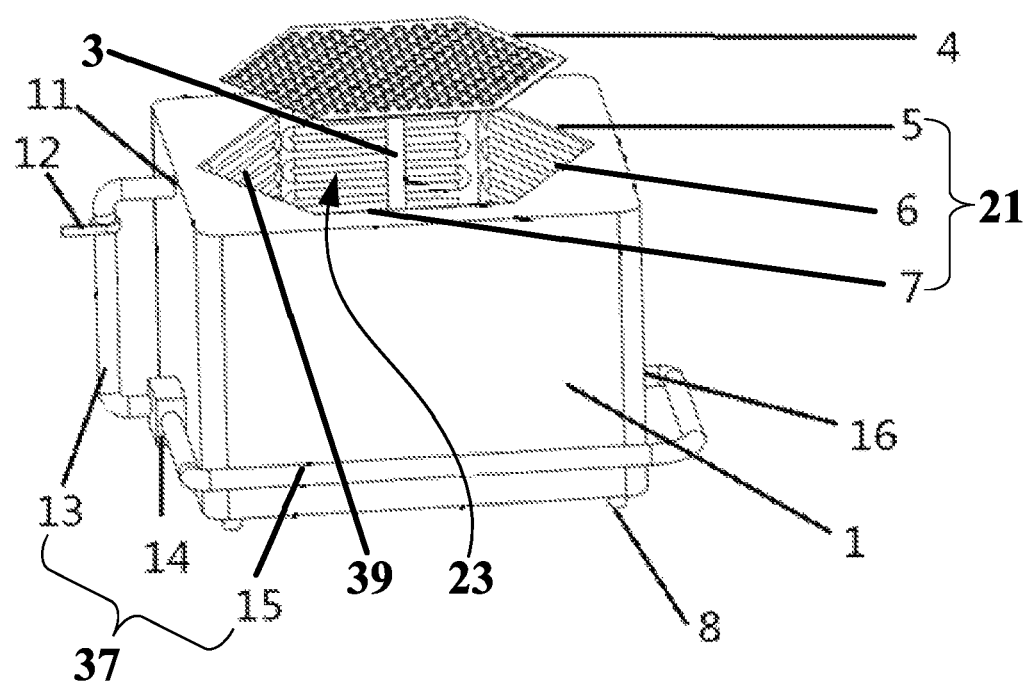
FIG. 1 schematically depicts a structure of an ultrasonic freezing equipment with a vortex tube in accordance with an embodiment of the present disclosure.

In the drawings: 1, casing; 2, control panel; 3, hydraulic telescopic column; 4, net cover; 5, 40-60 KHz ultrasonic frequency generator; 6, 20-40 KHz ultrasonic frequency generator; 7, 0-20 KHz ultrasonic frequency generator; 8, universal wheel; 9, vortex tube; 10, side surface; 11, salt solution inlet; 12, flow control valve; 13, inlet pipe; 14, pump; 15, outlet pipe; 16, salt solution outlet; 17, air compressor; 18, vortex chamber; 181, air inlet; 19, cold-end tube; 20, hot-end tube; 21, ultrasonic generator; 22, heat exchanger; 23, recess; 24, first ultrasonic generating plate; 25, second ultrasonic generating plate; 26, third ultrasonic generating plate; 27, fourth ultrasonic generating plate; 28, fifth ultrasonic generating plate; 29, sixth ultrasonic generating plate; 30, insulation cover; 31, regulating valve; 32, first thermocouple; 33, second thermocouple; 34, third thermocouple; 35, fourth thermocouple; 36, temperature-measuring device; 37, circulating pump system; 38, vortex-tube freezing device; and 39, refrigeration coil.

DETAILED DESCRIPTION OF EMBODIMENTS

The present disclosure will be further described below with reference to the accompany drawings and the embodiments.

As shown in FIGS. 1-4, an ultrasonic freezing equipment includes a casing 1, a circulating pump system 37, an ultrasonic generator 21, a vortex-tube freezing device 38 including a vortex tube 9 and a temperature-measuring device 36. A recess 23 is provided inside the casing 1. The recess 23 is of a hexagonal-prism shape. The recess 23 is configured as a freezing chamber of the ultrasonic freezing equipment, and is configured to accommodate a salt solution. The salt solution is configured to immerse a food to be frozen. The circulating pump system 37 is in communication with the recess 23. The circulating pump system 37 is configured to perform a circulating flow of the salt solution in the recess 23. A refrigeration coil 39 is arranged in the recess 23 of the casing 1. The vortex-tube freezing device 38 is connected to the refrigeration coil 39, and can adjust a temperature of the salt solution through the refrigeration coil 39, so as to freeze the food to be frozen in the salt solution. The ultrasonic generator 21 is configured to emit an ultrasonic wave to the food to be frozen in the salt solution, so as to reduce the food damage during a freezing process. A control panel 2 is arranged on the casing 1, and is configured to control a frequency of the ultrasonic generator 21. The temperature-measuring device 36 is arranged at an outer side of the ultrasonic generator 21, and is configured to measure a temperature of the salt solution. In an embodiment, a tester can know the real-time temperature of the salt solution through the temperature-measuring device 36, and thus the tester can intuitively know whether the salt solution meets the required temperature.

The circulating pump system 37 is turned on to make the salt solution in a flowing state. The ultrasonic generator 21 is turned on, and the frequency of the ultrasonic generator 21 is controlled through the control panel 2. The vortex-tube freezing device 38 adjusts the temperature of the salt solution through the refrigeration coil 39. The temperature of the salt solution is measured by the temperature-measuring device 36.

In an embodiment, the ultrasonic generator 21 can emit a plurality of ultrasonic waves of different frequency bands. Specifically, the performance of the plurality of ultrasonic waves with different frequency bands is preferable than that of ultrasonic waves with a single ultrasonic wave in reducing food damage during the freezing process.

In an embodiment, an ultrasonic wave switch in different frequency bands of the ultrasonic generator 21 is controlled through the control panel 2.

In an embodiment, the ultrasonic generator 21 can emit ultrasonic waves of three frequency bands, which are 0-20 KHz, 20-40 KHz and 40-60 KHz. The ultrasonic waves decrease the volume of ice crystals formed during the freezing process of food and increase the number of ice crystals formed, such that the formation of ice crystals is speed up, reducing the food damage during the freezing process and improving the food quality. The performance comparison of the three frequency bands in reducing the food damage during the freezing process is 0-20 KHz<20-40 KHz<40-60 KHz.

Figure 4:
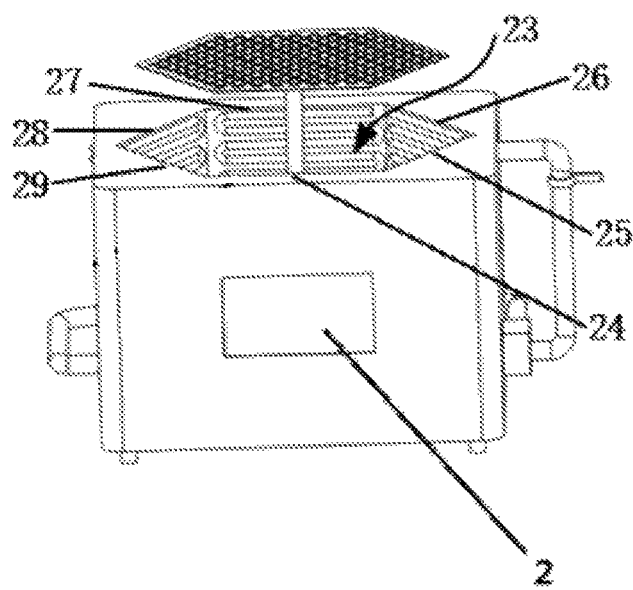
FIG. 4 schematically depicts the structure of the ultrasonic freezing equipment in accordance with an embodiment of the present disclosure from another view.

As shown in FIG. 4, the ultrasonic generator 21 includes six ultrasonic generating plates arranged in the recess 23, and the six ultrasonic generating plates includes a first ultrasonic generating plate 24, a second ultrasonic generating plate 25, a third ultrasonic generating plate 26, a fourth ultrasonic generating plate 27, a fifth ultrasonic generating plate 28 and a sixth ultrasonic generating plate 29. The first ultrasonic generating plate 24 and the fourth ultrasonic generating plate 27 are configured to emit an ultrasonic wave of 0-20 KHz. The second ultrasonic generating plate 25 and the fifth ultrasonic generating plate 28 are configured to emit an ultrasonic wave of 20-40 KHz. The third ultrasonic generating plate 26 and the sixth ultrasonic generating plate 29 are configured to emit an ultrasonic wave of 40-60 KHz.

As shown in FIG. 4, the recess 23 of the casing 1 is of a hexagonal-prism shape, and includes six side surfaces 10 connected end to end. The six ultrasonic generating plates are sequentially arranged on the corresponding six side surfaces 10 of the recess 23, such that the first ultrasonic generating plate 24 and the fourth ultrasonic generating plate 27 are arranged opposite to each other; the second ultrasonic generating plate 25 and the fifth ultrasonic generating plate 28 are arranged opposite to each other; and the third ultrasonic generating plate 26 and the sixth ultrasonic generating plate 29 are arranged opposite to each other.

In an embodiment, a side wall of the casing 1 is provided with a thermal insulation layer, and a thickness of the thermal insulation layer is 300-500 mm. The thermal insulation layer has a thermal insulation effect on the salt solution in the recess 23, so as to prevent the salt solution from warming up.

In an embodiment, the thermal insulation layer is made of polyurethane.

In an embodiment, the control panel 2 is arranged on the side wall of the casing 1.

In an embodiment, the six ultrasonic generating plates are divided into three groups. A first group consists of the first ultrasonic generating plate 24 and the fourth ultrasonic generating plate 27; a second group consists of the second ultrasonic generating plate 25 and the fifth ultrasonic generating plate 28; and a third group consists of the third ultrasonic generating plate 26 and the sixth ultrasonic generating plate 29. The control panel 2 is further configured to control an operation mode of the three groups of ultrasonic generating plates of the ultrasonic generator 21. Specifically, the control panel 2 controls the three groups of ultrasonic generating plates to work in a single-group mode, a double-group mode or a triple-group mode. The triple-group mode has the best performance in reducing the food damage during the freezing process, followed by the double-group mode, and the single-group has a less preferable performance than the other two.

As shown in FIGS. 1 and 4, the ultrasonic generator 21 includes a 0-20 KHz ultrasonic frequency generator 7, a 20-40 KHz ultrasonic frequency generator 6 and a 40-60 KHz ultrasonic frequency generator 5. The 40-60 KHz ultrasonic frequency generator 5 includes the first ultrasonic generating plate 24 and the fourth ultrasonic generating plate 27. The 20-40 KHz ultrasonic frequency generator 6 includes the second ultrasonic generating plate 25 and the fifth ultrasonic generating plate 28. The 0-20 KHz ultrasonic frequency generator 7 includes the third ultrasonic generating plate 26 and the sixth ultrasonic generating plate 29.

As shown in FIG. 1, in an embodiment, a universal wheel 8 is arranged at a bottom of the casing 1 to facilitate a transportation of the casing 1.

As shown in FIG. 1, in an embodiment, a plurality of universal wheels 8 spaced apart are arranged on the bottom of the casing 1, so as to allow the transportation of the casing 1 to be more stable. In this embodiment, four universal wheels 8 spaced apart are arranged on the bottom of the casing 1.

As shown in FIG. 1, in an embodiment, the circulating pump system 37 is arranged on the casing 1. The casing 1 is provided with a solution inlet 11 and a solution outlet 16. One end of the circulating pump system 37 is communicated with the recess 23 of the casing 1 through the salt solution inlet 11, and the other end of the circulating pump system 37 is communicated with the recess 23 of the casing 1 through the salt solution outlet 16. The salt solution in the recess 23 of the casing 1 can enter the circulation pump system 37 through the salt solution outlet 16 under a suction of the circulation pump system 37, and then flow back into the recess 23 of the casing 1 through the salt solution inlet 11.

As shown in FIG. 1, in an embodiment, the circulating pump system 37 is arranged on a side wall of the casing 1.

As shown in FIG. 1, in an embodiment, the salt solution inlet 11 and the salt solution outlet 16 are arranged on two sides of the casing 1 that are opposite to each other.

As shown in FIG. 1, in an embodiment, a height of the salt solution inlet 11 is higher than that of the salt solution outlet 16.

As shown in FIG. 1, in an embodiment, the circulating pump system 37 includes an inlet pipe 13, a pump 14 and an outlet pipe 15. The inlet pipe 13 and the outlet pipe 15 are connected through the pump 14. The inlet pipe 13 is communicated with the recess 23 of the casing 1 through the salt solution inlet 11. The outlet pipe 15 is communicated with the recess 23 of the casing 1 through the salt solution outlet 16. The salt solution in the recess 23 can enter the inlet pipe 13 under a suction of the pump 14, and flow back into the recess 23 through the outlet pipe 15.

As shown in FIG. 1, in an embodiment, a flow control valve 12 is provided on the inlet pipe 13. The flow control valve 12 is configured to control a flow rate of the salt solution in the inlet pipe 13.

Figure 3:
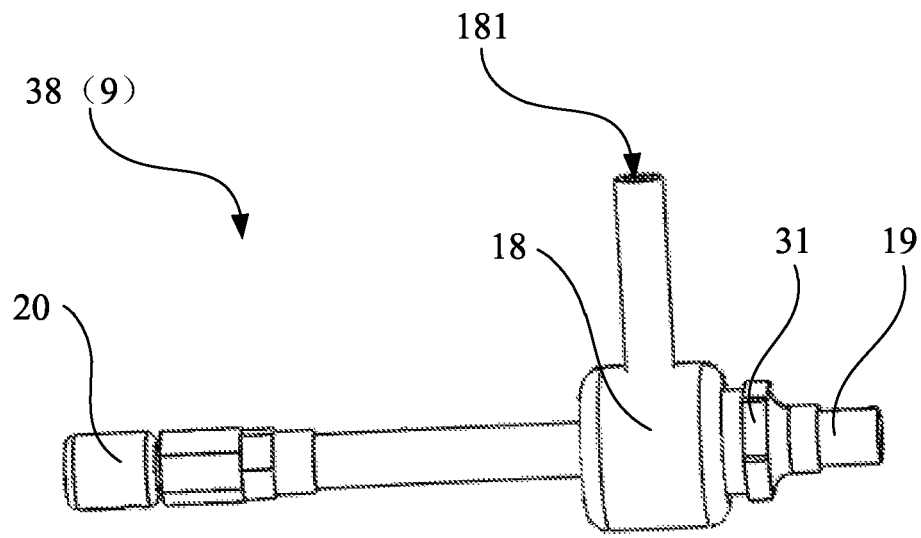
FIG. 3 schematically depicts a structure of a vortex tube in accordance with another embodiment of the present disclosure.
Figure 5:
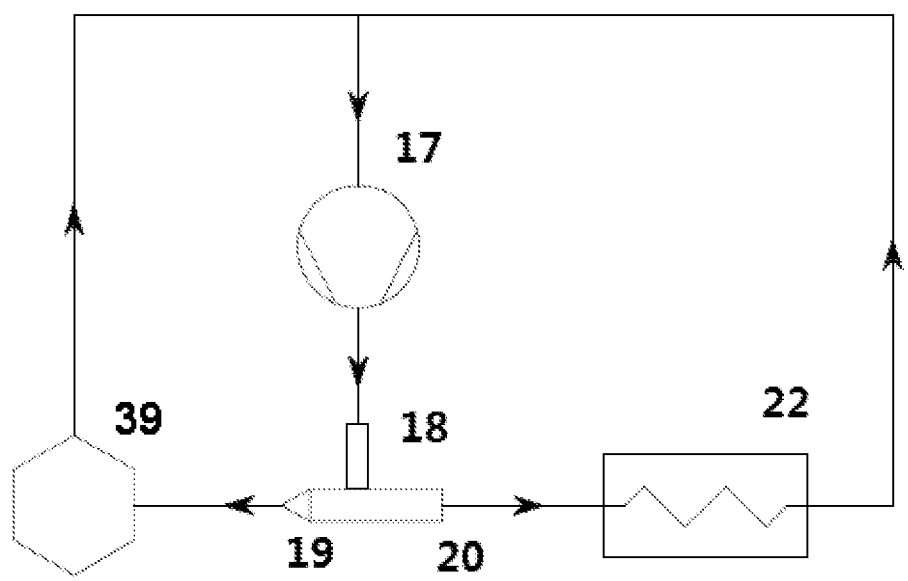
FIG. 5 illustrates an operation principle of ultrasonic freezing equipment according to an embodiment of the present disclosure.

As shown in FIGS. 3 and 5, in an embodiment, the vortex tube freezing device 38 includes three groups of vortex tubes, and each of the three groups of vortex tubes includes two vortex tubes 9. Six vortex tubes 9 in the three groups of vortex tubes are the same vortex tubes.

The ultrasonic freezing equipment further includes an air compressor 17 and a heat exchanger 22. The vortex tube 9 includes a vortex chamber 18, a cold-end tube 19 and a hot-end tube 20 communicated with each other. The cold-end tube 19 is connected to the refrigeration coil 39. The hot-end tube 20 is connected to the heat exchanger 22. The vortex chamber 18 is connected to the air compressor 17. The air compressor 17 is configured to compress air to obtain a working gas and transmit the working gas to the vortex chamber 18, such that the working gas can work in the vortex chamber 18 to form a cold air flow and a hot air flow. The cold air flow in the vortex chamber 18 can flow to the refrigeration coil 39 through the cold-end tube 19, and then exchange heat with the salt solution in the recess 23 through the refrigeration coil 39 to adjust the temperature of the salt solution. The hot air flow in the vortex chamber 18 can flow to the heat exchanger 22 through the hot-end tube 20, and then perform a heat exchange between the hot-end tube 20 and an outside atmosphere through the heat exchanger 22. The vortex tube 9 is a refrigeration device without any moving parts, and a structure thereof is simple. The vortex tube is generally applied to the cooling of cutting tools and other occasions in which local cooling is required, and can directly use compressed air to generate an air flow with a temperature difference of up to 30° C., so as to cool the required objects. Specifically, the refrigeration coil 39 increases a heat-exchange area between the cold air flow and the salt solution in the recess 23.

In an embodiment, the vortex chamber 18 is provided with an air inlet 181. The air inlet 181 is connected to the air compressor 17. The air compressor 17 is configured to compress air to obtain the working gas, and transmit the working gas to the vortex chamber 18 through the air inlet 181.

In an embodiment, the working gas is transmitted into the vortex chamber 18 through the air inlet 181 and then rotates at a high speed to form a swirling flow. The swirling flow is divided into the cold air flow and the hot air flow through expansion work.

In an embodiment, the refrigeration coil 39 is a serpentine coiled pipe. The serpentine coiled pipe increases a contact area between the refrigeration coil 39 and the salt solution in the recess 23, so as to exchange heat with the salt solution more reliably.

Figure 2:
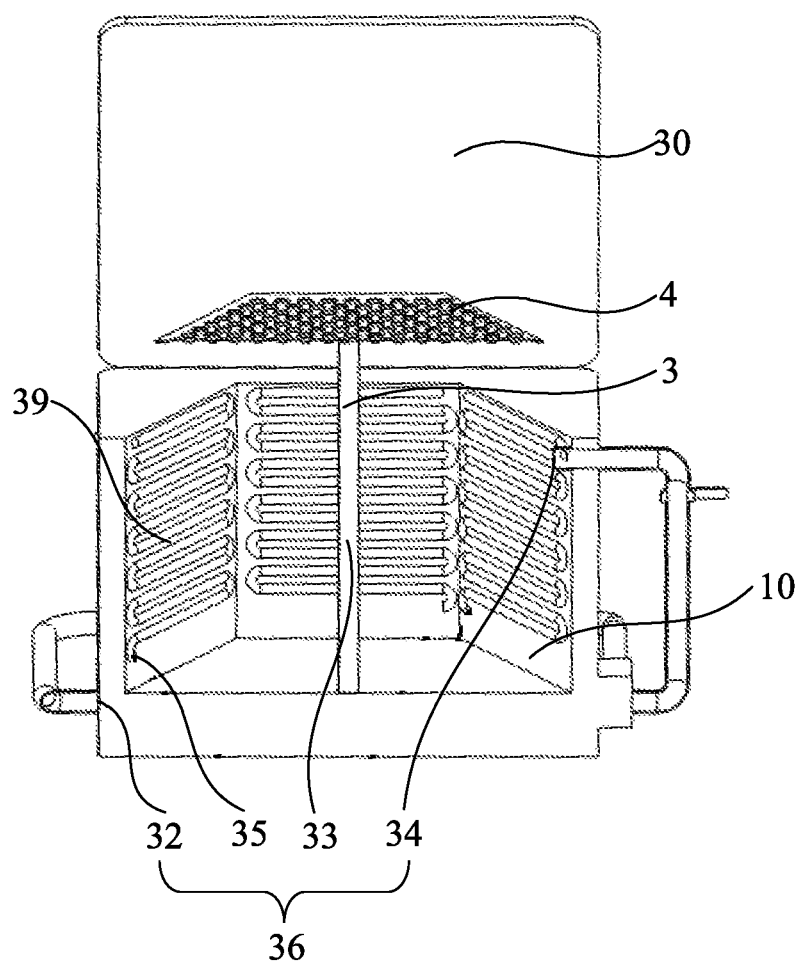
FIG. 2 is a cross-sectional view of the ultrasonic freezing equipment shown in FIG. 1.

As shown in FIG. 2, in an embodiment, the temperature-measuring device 36 includes a first thermocouple 32, a second thermocouple 33, a third thermocouple 34 and a fourth thermocouple 35. The first thermocouple 32 is configured to measure a temperature at the salt solution outlet 16. The second thermocouple 33 is configured to measure a temperature of the salt solution in the recess 23. The third thermocouple 34 is configured to measure a temperature at the salt solution inlet 11. The fourth thermocouple 35 is configured to measure a temperature at an outlet of the refrigeration coil 39.

As shown in FIG. 2, in an embodiment, the ultrasonic freezing equipment further includes an insulation cover 30. The insulation cover 30 is arranged on the casing 1, and is configured to prevent the salt solution in the recess 23 from warming up.

In an embodiment, a heat preservation layer is provided in the insulation cover 30 of the casing 1.

Usually, when the ultrasonic freezing equipment is used to freeze a food, the food is not directly put into the recess 23 of the box 1 since a convective heat transfer coefficient of air is low. In order to increase a heat transfer coefficient between the food and the ultrasonic freezing equipment, a salt solution is used as a heat transfer medium between the food and the ultrasonic freezing equipment. In some embodiments, the salt solution is a calcium chloride solution.

As shown in FIGS. 1-3, in an embodiment, the ultrasonic freezing equipment further includes a hydraulic telescopic mast 3 and a net cover 4. The net cover 4 is connected to the hydraulic telescopic mast 3. The hydraulic telescopic mast 3 is arranged in the recess 23, and is connected to a bottom of the recess 23. The hydraulic telescopic mast 3 is telescopic to drive the net cover 4 to move up and down. The net cover 4 is configured to press and fix the food. The vortex tube 9 further includes a regulating valve 31 connected to the cold-end tube 19. The regulating valve 31 is configured to adjust a flow rate of the cold air flow in the cold-end tube 19 flowing into the refrigeration coil 39, so as to adjust the temperature of the salt solution. Before starting the ultrasonic-assisted freezing, the vortex tube 9 is turned on to adjust the temperature of the salt solution in the recess 23. When the temperature inside the recess 23 of the casing 1 reaches a set temperature and the temperature is kept at a constant, the salt solution is put into the recess 23 of the casing 1 for pre-cooling. Meanwhile, the temperature-measuring device 36 is used to monitor the temperature of the salt solution. When the temperature is consistent with a desired initial temperature of the food, the food to be frozen is put into the salt solution. Since a density of the food is generally lower than that of the salt solution, when the amount of food put into the recess 23 reaches a certain limit, the hydraulic telescopic column 3 is turned on to drive the mesh cover 4 to move down, so as to press the food into the salt solution, such that the food is submerged in the salt solution and a thermal conductivity between the food and the ultrasonic freezing equipment is increased. At this time, a required ultrasonic frequency is turned on, or the three frequencies are turned on at the same time. Finally, the pump 14 is turned on to allow the salt solution inside the casing 1 in a fast-flowing state, such that a temperature field inside the salt solution is uniform, and then the food in the salt solution is uniformly frozen with high-quality frozen performance. Specifically, the salt solution is a calcium chloride solution.

A freezing method using the ultrasonic freezing equipment are described as follows.

The salt solution is prepared, and injected into the recess 23 inside the casing 1.

A food to be frozen is put into the salt solution.

The vortex-tube freezing device 38 is turned on to adjust a temperature of the salt solution.

The circulating pump system 37 is turned on to circulate the salt solution in the recess 23.

The ultrasonic generator 21 is turned on to emit an ultrasonic wave to the food to be frozen in the salt solution.

A temperature of the salt solution is monitored in real time by using the temperature-measuring device 36.

A frozen food is taken out from the salt solution after the freezing process is completed.

The above-mentioned embodiments are only illustrative of the principle and beneficial effects of this disclosure, and are not intended to limit the present disclosure. Modifications and changes made by those skilled in the art without departing from the spirit of this disclosure should fall within the scope of the present disclosure defined by the appended claims.

What is claimed is:

1. An ultrasonic freezing equipment, comprising:
a casing;
a circulating pump system;
an ultrasonic generator;
a vortex-tube freezing device comprising a vortex tube;
a temperature-measuring device;
a hydraulic telescopic mast; and
a net cover;
wherein the casing has a cuboid shape; a recess is provided inside the casing; the recess is of a hexagonal-prism shape, and comprises six side surfaces connected end to end; the recess is configured as a freezing chamber of the ultrasonic freezing equipment, and is configured to accommodate a salt solution; the salt solution is configured to immerse a food to be frozen;
the circulating pump system is in communication with the recess; the circulating pump system is configured to perform a circulating flow of the salt solution in the recess;
a refrigeration coil is arranged in the recess of the casing; the vortex tube comprises a vortex chamber, a cold-end tube and a hot-end tube communicated with each other; the vortex-tube freezing device is connected to the refrigeration coil; the vortex-tube freezing device is configured to adjust a temperature of the salt solution through the refrigeration coil, so as to freeze the food to be frozen in the salt solution;
the ultrasonic generator is configured to emit an ultrasonic wave to the food to be frozen in the salt solution, so as to reduce a damage during a freezing process; the ultrasonic generator comprises six ultrasonic generating plates, and the six ultrasonic generating plates are sequentially arranged on the six side surfaces of the recess; the six ultrasonic generating plates consists of a first ultrasonic generating plate, a second ultrasonic generating plate, a third ultrasonic generating plate, a fourth ultrasonic generating plate, a fifth ultrasonic generating plate and a sixth ultrasonic generating plate; the first ultrasonic generating plate and the fourth ultrasonic generating plate are configured to emit an ultrasonic wave of 0-20 KHz; the second ultrasonic generating plate and the fifth ultrasonic generating plate are configured to emit an ultrasonic wave of 20-40 KHz; and the third ultrasonic generating plate and the sixth ultrasonic generating plate are configured to emit an ultrasonic wave of 40-60 KHz;
a control panel is arranged on the casing, and is configured to control a frequency of the ultrasonic generator;
the temperature-measuring device is arranged near an inside surface of the ultrasonic generator, and is configured to measure a temperature of the salt solution; and
the net cover is connected to the hydraulic telescopic mast; the hydraulic telescopic mast is arranged in the recess, and is connected to a bottom of the recess; the hydraulic telescopic mast is telescopic to drive the net cover to move up and down; and the net cover is configured to press and fix the food.

2. The ultrasonic freezing equipment of claim 1, wherein the ultrasonic generator is configured to emit ultrasonic waves of different frequency bands.

3. The ultrasonic freezing equipment of claim 1, wherein the ultrasonic generator is configured to emit ultrasonic waves of three frequency bands, and the three frequency bands are 0-20 KHz, 20-40 KHz and 40-60 KHz, respectively.

4. The ultrasonic freezing equipment of claim 1, wherein a side wall of the casing is provided with a thermal insulation layer, and a thickness of the thermal insulation layer is 300-500 mm.

5. The ultrasonic freezing equipment of claim 1, wherein the circulating pump system is arranged on the casing; the casing is provided with a salt solution inlet and a salt solution outlet; one end of the circulating pump system is communicated with the recess of the casing through the salt solution inlet; the other end of the circulating pump system is communicated with the recess of the casing through the salt solution outlet; and the salt solution in the recess of the casing is capable of entering the circulation pump system through the salt solution outlet under an action of the circulation pump system, and then flowing back into the recess of the casing through the salt solution inlet.

6. The ultrasonic freezing equipment of claim 5, wherein the circulating pump system comprises an inlet pipe, a pump and an outlet pipe; the inlet pipe and the outlet pipe are connected through the pump; the inlet pipe is communicated with the recess of the casing through the salt solution inlet; the outlet pipe is communicated with the recess of the casing through the salt solution outlet; and the salt solution in the recess is driven under a suction of the pump to enter the inlet pipe, and flow back into the recess through the outlet pipe.

7. The ultrasonic freezing equipment of claim 1, wherein the refrigeration coil is a serpentine coiled pipe.

8. The ultrasonic freezing equipment of claim 1, wherein the ultrasonic freezing equipment further comprises an air compressor and a heat exchanger; the cold-end tube is connected to the refrigeration coil; the hot-end tube is connected to the heat exchanger; the vortex tube is connected to the air compressor; the air compressor is configured to compress air to obtain a working gas and transmit the working gas to the vortex chamber; the working gas is capable of doing work in the vortex chamber to form a cold air flow and a hot air flow; the cold air flow in the vortex chamber is capable of flowing to the refrigeration coil through the cold-end tube, and then exchanging heat with the salt solution in the recess through the refrigeration coil to adjust the temperature of the salt solution; and the hot air flow in the vortex chamber is capable of flowing to the heat exchanger through the hot-end tube, and then performing a heat exchange between the hot-end tube and an outside atmosphere through the heat exchanger.

9. The ultrasonic freezing equipment of claim 1, wherein the six ultrasonic generating plates are divided into three groups; a first group consists of the first ultrasonic generating plate and the fourth ultrasonic generating plate; a second group consists of the second ultrasonic generating plate and the fifth ultrasonic generating plate; a third group consists of the third ultrasonic generating plate and the sixth ultrasonic generating plate; and the control panel is configured to control an operation mode of the three groups of ultrasonic generating plates of the ultrasonic generator.

10. A freezing method using the ultrasonic freezing equipment of claim 1, comprising:
preparing the salt solution, and injecting the salt solution into the recess inside the casing;
putting a food to be frozen into the salt solution;
turning on the vortex-tube freezing device to adjust a temperature of the salt solution;
turning on the circulating pump system to circulate the salt solution in the recess;
turning on the ultrasonic generator to emit an ultrasonic wave to the food to be frozen in the salt solution;

monitoring, by the temperature-measuring device, a temperature of the salt solution in real time; and taking out a frozen food from the salt solution after a freezing process is completed.

\* \* \* \* \*